(12) United States Patent
Marbach et al.

(10) Patent No.: US 6,654,355 B1
(45) Date of Patent: Nov. 25, 2003

(54) BRIDGE FOR CAN TO TCP/IP CONNECTION

(75) Inventors: Alain Marbach, Belmont, MA (US); Wolfgang Langer, Portsmouth, NH (US)

(73) Assignee: Schneider Automation Inc., North Andover, MA (US)

( * ) Notice: Subject to any disclaimer, the term of this patent is extended or adjusted under 35 U.S.C. 154(b) by 0 days.

(21) Appl. No.: 09/460,575

(22) Filed: Dec. 14, 1999

(51) Int. Cl.[7] ................................................. H04B 3/30
(52) U.S. Cl. ........................ 370/285; 370/466; 370/469; 370/474
(58) Field of Search ................................. 370/285, 466, 370/469, 474, 490, 389

(56) References Cited

U.S. PATENT DOCUMENTS

| | | | | |
|---|---|---|---|---|
| 5,732,074 | A | * 3/1998 | Spaur et al. | 370/313 |
| 6,292,862 | B1 | * 9/2001 | Barrenscheen et al. | 710/306 |
| 6,434,156 | B1 | * 8/2002 | Yeh | 370/401 |

FOREIGN PATENT DOCUMENTS

| | | | | |
|---|---|---|---|---|
| EP | 1197396 A2 | * | 4/2002 | B60R/16/02 |
| EP | 1233577 A2 | * | 8/2002 | H04L/12/413 |

OTHER PUBLICATIONS

Stevens, W. Richard, "TCP/IP Illustrated, vol. 1", 1994, Addison Wesley, pp. 9–10.*
Eltze, Jens, "Double–CAN Controller as Bridge for Different CAN Networks", 1997, NEC Electronics*
Ekiz, Kutlu, Baba, and Powner, "Performance Analysis of a CAN/CAN Bridge", 1996, University of Sussex School of Engineering.*
Ekiz, Kutlu, and Powner, "Design and Implementation of a CAN/CAN Bridge", 1996, University of Sussex School of Engineering.*
"CAN Specification, Version 2.0," R. Bosch GmbH, pp. 1–68, Sep. 1991.
"The CAN Protocol," downloaded from http://www/kvaser. com/can/protocol, downloaded on Aug. 30, 1999; copyright 1998, 2 pp.
"ISACAN–PC–The Hitex intelligent CAN interface for PCs," Hitex Automation Engineering, pp. 1–3, downloaded from http://www.hitex.com/aut/ehicanpc.htm, downloaded on Sep. 1, 1999.

* cited by examiner

*Primary Examiner*—Alpus H. Hsu
*Assistant Examiner*—Michael Molinari
(74) *Attorney, Agent, or Firm*—Michael J. Femal; Larry I. Golden

(57) ABSTRACT

A method and corresponding apparatus for communicating a controller area network (CAN) message between a sending node, attached to a sending CAN network, and a receiving node, where the sending and receiving nodes are interconnected by a network communicating according to transmission control protocol/Internet protocol (TCP/IP). The invention provides for having the sending node extract the CAN message payload (arbitration field, control field and data field if any) from a CAN message, having it embed the CAN message payload in a TCP/IP frame as the TCP/IP data field of the TCP/IP frame, having it refer to a routing form to determine the address on the TCP/IP network of the receiving node; and having it transmit the TCP/IP frame over the TCP/IP network using the address for the receiving node from the routing form. The invention also provides for having the receiving node extract the CAN message payload from the TCP/IP frame, and alter the identifier of the CAN message payload, as needed, so as to correspond to the CAN message content at the receiving node (i.e. in case the receiving node is attached to a receiving CAN network, to correspond to the CAN message content of the receiving CAN network, but if the receiving node hosts a browser and is not attached to a receiving CAN network, to correspond to the CAN message content according to the preference of the user of the browser), the altering performed by reference to a mapping-relating identifiers based on the network address of the sending node.

5 Claims, 7 Drawing Sheets

US 6,654,355 B1

BRIDGE FOR CAN TO TCP/IP CONNECTION

BACKGROUND OF THE INVENTION

1. Technical Field

The present invention pertains to the field of network communication. More particularly, the present invention pertains to enabling communication between two or more controller area network (CAN) nodes of different CAN networks connected by a network implementing transmission control protocol/Internet protocol (TCP/IP), such as the Internet or an Ethernet.

2. Description of Related Art

A recent innovation in local area networks is the Control Area Network (CAN) standard, the basic level of which is identified in ISO 11898 and ISO 11519-1. The CAN standard was originally developed to specify distributed real-time control system requirements in automotive applications. An implementation according to the CAN standard is a real-time, distributed control system including different electronic components that communicate with each other not by signals carried by dedicated wires, but by signals conveyed by a linear bus according to the CAN protocol. Manufacturers such as Intel, Phillips, National Semiconductor, Nippon Electric Company, Siemens and Motorola provide very low cost CAN chips that conform to the protocol. The use of CAN technology has been extended to other custom applications, including industrial control applications.

As shown in FIG. 1, a CAN-type network 11a provides for communication of pre-determined messages between stations 12a (nodes of the CAN network, each of which are a control unit) interconnected in a linear bus structure by a CAN bus 14a. Each CAN station is the peer of every other station. Instead of addressing a message to another station by indicating the other station, a transmitting station indicates to all other stations the content of the message using an identifier provided with the message. In such content-based addressing, each message is broadcast to all other, receiving stations, and each receiving station discards the message unless the message is on a pre-determined acceptance list for the receiver.

There are now two versions of CAN, differing in the length of the identifier. A CAN implementation according to the CAN specification, part A, uses an 11-bit identifier. One according to the CAN specification, part B, uses a 29-bit identifier. See *CAN Specification, Version* 2.0, by Robert Bosch GmbH, Postfach 50, D-7000 Stuttgart 1.

Any station of a CAN network can use the CAN bus to transmit (broadcast) a message when the bus is unoccupied. While transmitting a message, a station monitors the bus for an indication that another station is also attempting to transmit a message. If another station is also attempting to use the bus, the contention for the bus is arbitrated using a scheme in which each message is pre-assigned a priority that accompanies the message.

Message transfer in a CAN-type network is achieved using four types of frames. A data frame, as shown in FIG. 2, conveys data from a transmitter station to receiver stations, and has an identifier (of different length depending on the version of CAN, as described above) that indicates the type of message, i.e. its content, used for content-addressing. A remote frame, as shown in FIG. 3, conveys a request for a data frame having an identifier that is the same as used in the remote frame. A remoter frame uses a remote transmission request (RTR) bit to identify itself, i.e. to indicate that it is a request for a CAN message. An error frame, as shown in FIG. 4, is transmitted by any station when the station detects a communication (bus) error, i.e. when the station receives a message but the cyclic redundancy check (CRC) for the message fails. An overload frame (not shown), is used to provide extra delay between data frames or remote frames, a delay that is in addition to the interfame spacing (FIG. 2).

Various application layers have been developed with specifications specifically oriented to industrial and process control applications, control networks for heavy duty trucks and buses, distributed control systems and control networks for cars. However, all of these systems are limited to inter-node communication, and will not support communicating with nodes across an intervening network using a different protocol, such as TCP/IP, which is used for communication on the Internet.

What is needed is a device that enables communication between stations of two different CAN-type networks interconnected by an intervening network, and especially an intervening network using TCP/IP, such as the Internet. Such a device would have to overcome the difficulty that a TCP/IP network uses physical addressing, while a CAN network uses content-based addressing, as indicated above.

What is also needed is a way to view the content of messages being communicated in a CAN-type network using a remote computer interconnected to the CAN-type network via an intervening network using TCP/IP, such as the Internet. This would allow both monitoring a CAN-type network and also diagnosing problems for the CAN-type network, all from a remote location.

SUMMARY OF THE INVENTION

Accordingly, the present invention provides a method and corresponding apparatus for communicating a controller area network (CAN) message between a sending node, attached to a sending CAN network, and a receiving node; where the sending and receiving nodes are interconnected by a network communicating according to transmission control protocol/Internet protocol (TCP/IP); where the CAN message includes a CAN message payload, which in turn includes an identifier field, intended to identify the content of the CAN message, based on a pre-determined identifier-content correspondence that is CAN-network-dependent or, more generally, node-dependent, a remote transmission request bit, a control field, and a data field, if any; and where the communicating is according to TCP/IP performed by transmitting TCP/IP frames, including a header, a footer, and a TCP/IP data field. The invention provides for having the sending node extract the CAN message payload from the CAN message; having the sending node embed the CAN message payload in the TCP/IP frame as the TCP/IP data field of the TCP/IP frame; having the sending node refer to a routing form to determine the address on the TCP/IP network of the receiving node; and having the sending node transmit the TCP/IP frame over the TCP/IP network using the address for the receiving node from the routing form.

In a further aspect of the invention, the receiving node extracts the CAN message payload from the TCP/IP frame; alters the identifier of the CAN message payload, as needed, so as to correspond to the CAN message content at the receiving node, the altering performed by reference to a mapping relating identifiers according to their usage at different network addresses; and, if the receiving node is attached (directly connected) to a CAN network, having the receiving node broadcast the CAN message on the CAN network to which it is directly connected. If the receiving node hosts a browser, there is no broadcasting of the received CAN message payload, but only a displaying of the CAN message by the browser for examination by the user of the browser.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The preferred embodiment will now be described in the particular application where controller area network (CAN) messages are provided over the Internet. The Internet is here used as one example of a network communicating according to transmission control protocol/Internet protocol (TCP/IP). It is be understood that the present invention is directed to the communication of CAN messages over any network using TCP/IP, such as any Ethernet, not only the Internet.

Figure 1:
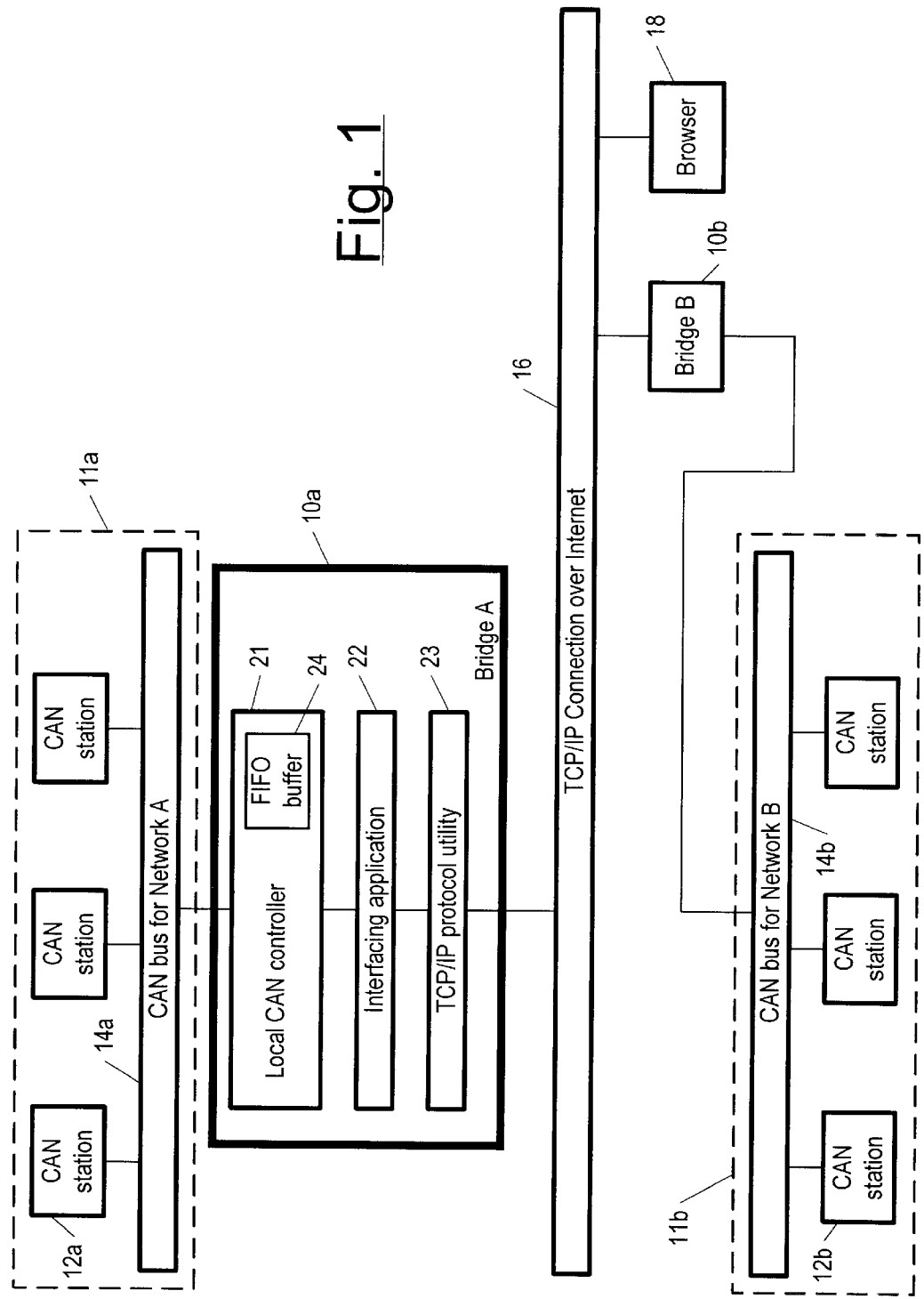
FIG. 1 is a block diagram showing the interconnection by a TCP/IP network of a CAN-type network with both another CAN-type network and also with a browser, according to the present invention.
Figure 2:
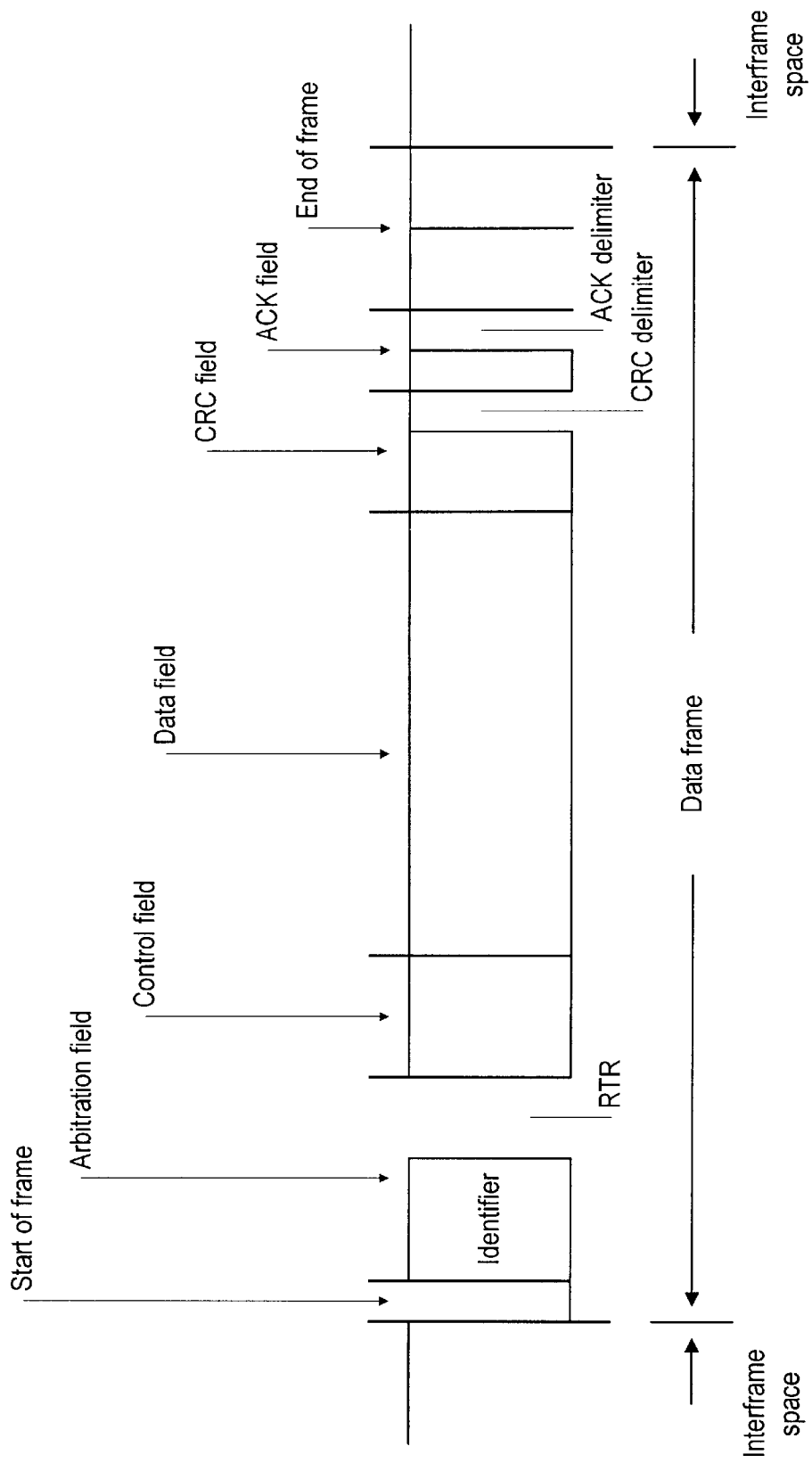
FIG. 2 is a data structure diagram for a CAN data frame.
Figure 3:
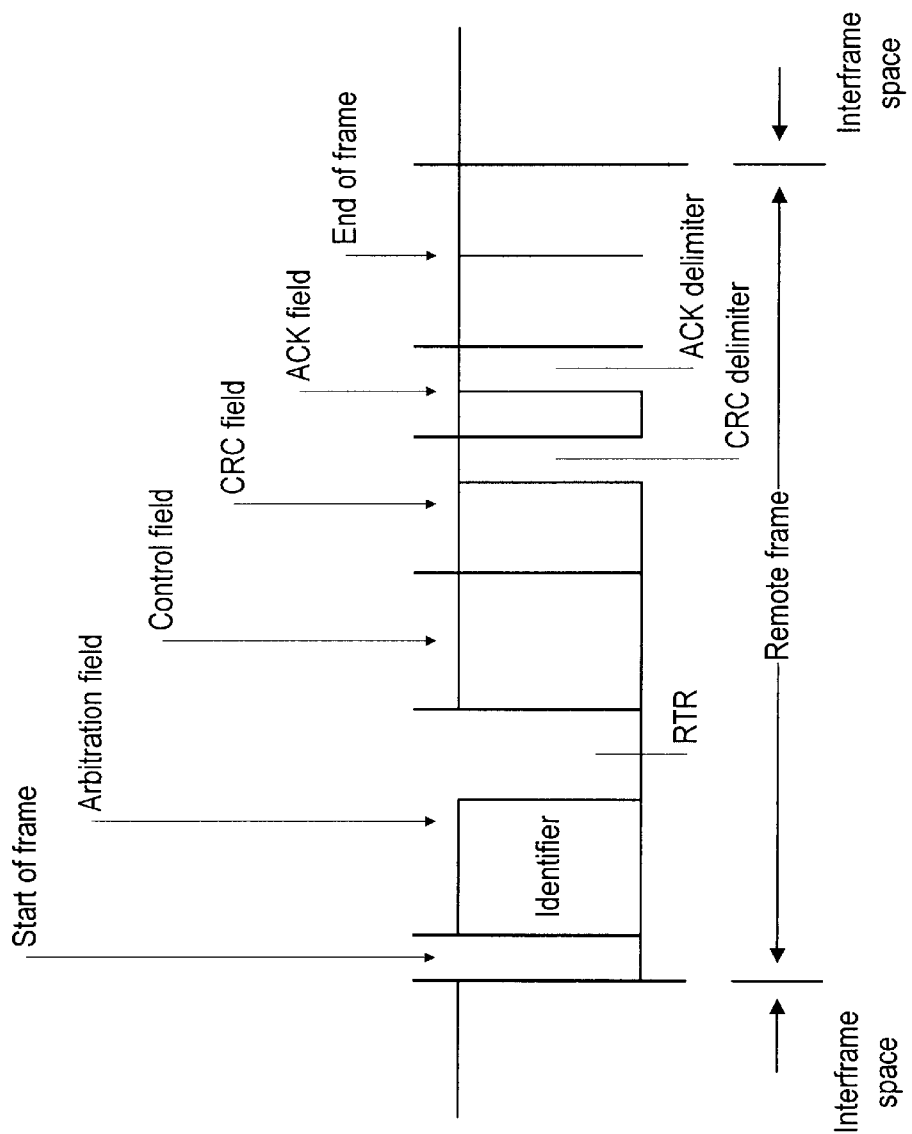
FIG. 3 is a data structure diagram for a CAN remote frame.
Figure 4:
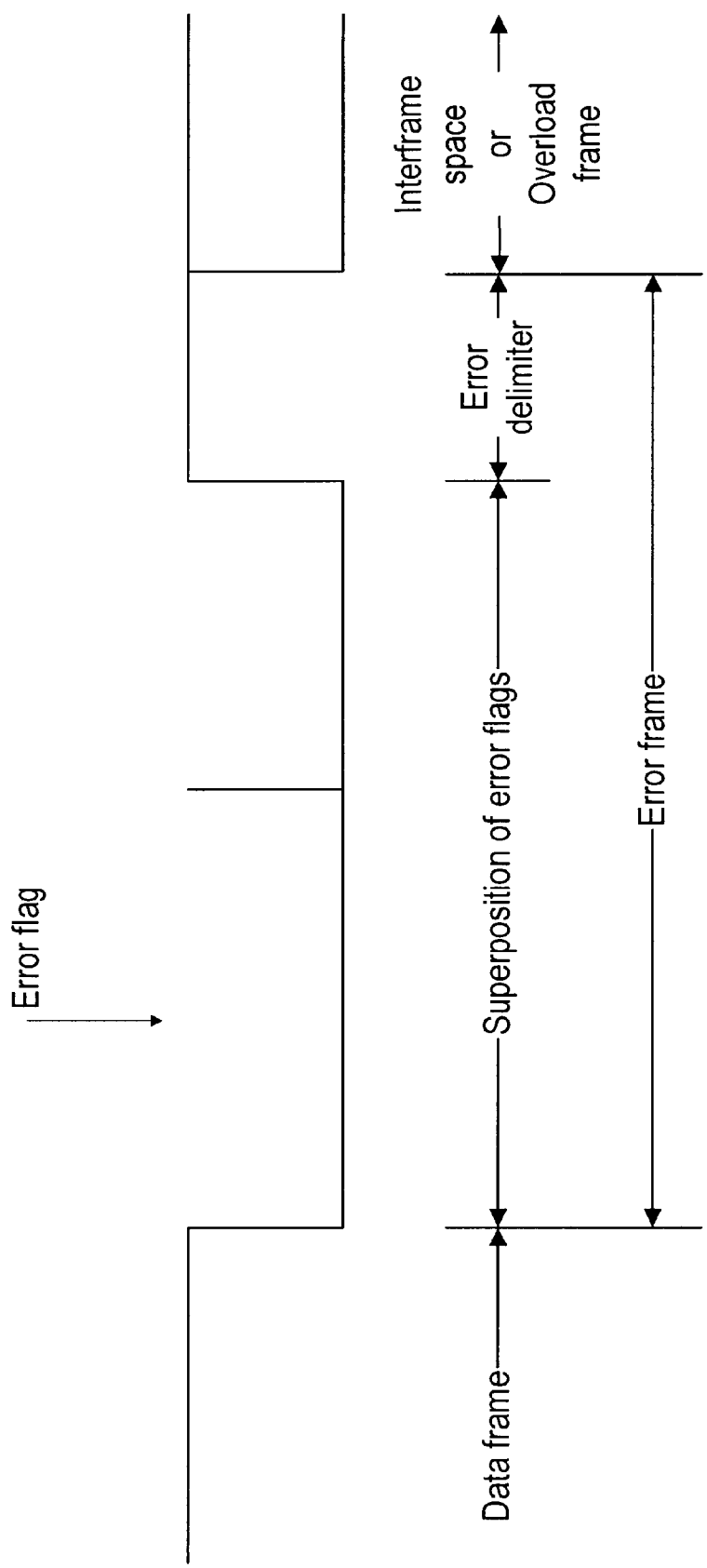
FIG. 4 is a data structure diagram for a CAN error frame.

Referring now to FIG. 1, a bridge 10a for connecting a controller area network (CAN) 11a to an Internet connection 16, which requires transmission control protocol/Internet protocol (TCP/IP), is shown as including a local CAN controller 21 for communicating over the CAN network 11a; TCP/IP protocol utility 23 for communicating over the Internet via the Internet connection 16; and an interfacing application 22 for converting CAN messages to a form suitable for communicating over the Internet, i.e. to a form according to TCP/IP, and also for converting Internet communications to a form suitable for communication over a CAN network, i.e. to a form according to one or another of various prescribed CAN message types. The CAN network 11a includes CAN stations 12a communicating via a CAN bus 14a, through which the bridge 10a also communicates with the CAN stations 12a.

Still referring to FIG. 1, a CAN station 12a in a first CAN network 11a, can transmit, via a bridge 10a according to the present invention, a message that is on an acceptance list of a CAN station 24 in a second CAN network 11b, interconnected with the first CAN network by the Internet. For this, the CAN station 24 of the second CAN network 11b depends on a second bridge 10b.

Besides being able to transmit a message that is received by a CAN station 24 of a second CAN network 11b, a CAN station 12a of the first CAN network 11a can transmit a message so that is viewed by a browser communicating over the Internet via the Internet connection 16. For this, the browser 18 relies on the services of the bridge 10a to convert the CAN message to a form suitable for TCP/IP communication.

Figure 5:
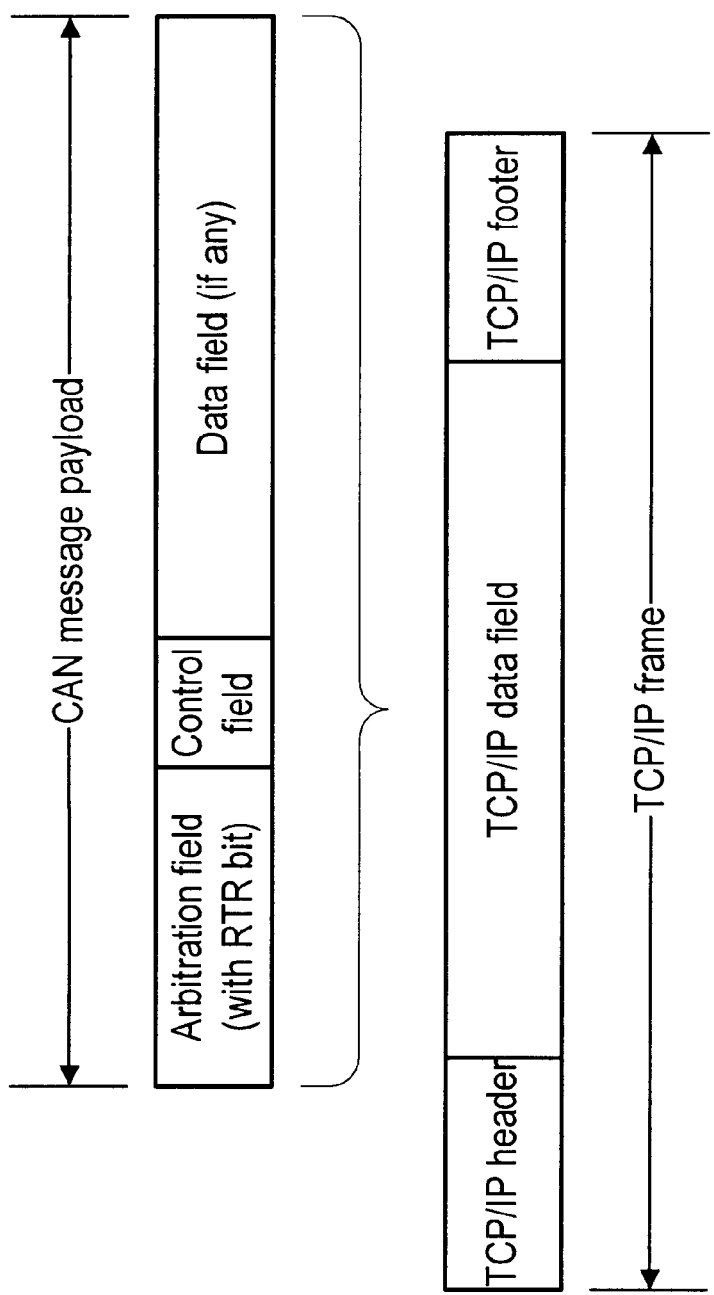
FIG. 5 is a data structure diagram showing a CAN message included in a TCP/IP frame, according to the present invention.

Referring now to FIG. 5, according to the preferred embodiment, a CAN message payload, i.e. a CAN message less framing bits and its CRC and acknowledgment (ACK) fields (the ACK field being used to signal to a sending station when a CAN message is received without error), is embedded in a TCP/IP data field of a TCP/IP frame. A TCP/IP data field can be up to several kilobytes in length, compared to 11 bytes as the maximum length of a CAN message payload. In some aspects of the present invention, this disparity is taken advantage of by embedding more than one CAN message payload in a TCP/IP frame. In the preferred embodiment, if the bridge 10a is embedding a first CAN message in a TCP/IP frame, and a second CAN message (for the same destination) is detected before a predetermined time interval elapses, the interfacing application will arrange to have the second CAN message payload added to the same TCP/IP data field, and so on, as described below. The predetermined waiting time is typically a second, but is sometimes as much as 5 seconds.

According to the preferred embodiment of the present invention, the only two CAN message types that are embedded in a TCP/IP frame are a CAN data frame and a CAN remote frame. The CAN error frame is not needed because when a local station 12a broadcasts a CAN message and the local CAN controller 21 receives the CAN message, the local CAN controller 21 will signal (on the CAN bus 14a) any error in communication over the CAN bus 14a. And when a CAN message is transmitted by the bridge 10a over the Internet, the Internet TCP/IP provides for error detection and correction. Finally, if a message is intended for a CAN station 12b of the second CAN network 11b, the bridge 10b attached to the CAN bus 14b for the second network extracts the CAN message from the TCP/IP data frame, constructs a CAN data frame or CAN remote frame (depending simply on whether the CAN message contains data), and broadcasts the CAN message on the CAN bus 14b for the second CAN network 11b. From that point on, the CAN protocol for error detection and correction becomes effective. Thus it is unnecessary for the bridge 10a to include either a CRC field or an ACK field in a TCP/IP data frame when communicating a CAN message over the Internet.

Referring again to FIG. 1, the local CAN controller 21 of the bridge 10a, which is built around a standard CAN chip, e.g. the SJA 1000, interfaces the bridge 10a to the CAN network 11a. In this interfacing, the local CAN controller 21 provides for proper bit-timing, and performs bit encoding and synchronization. As the interface to the CAN network 11a, it also responds to error frames in case of transmitting a CAN message that is not properly received by one or more CAN stations on the CAN network 11a. In addition, as mentioned above, it signals an error in communication when it receives a CAN message, over the CAN network 11a, for which the CRC fails.

Finally, the local CAN controller 21 has, in the preferred embodiment, its own acceptance list, and it acknowledges successful receipt of all CAN messages on that acceptance list. Such a list is used in case of some CAN messages being intended for CAN stations of another CAN network, such as the second CAN network 11b, with which communication is through the bridge 10a and over the Internet.

The bridge 10a, including the local CAN controller 21, is hosted by a computer (not shown), which in the preferred embodiment uses an internal bus (not shown) for communicating between various controllers, such as between the local CAN controller 21 and the CPU (not shown) of the computer. The local CAN controller is, for example, a card in an ISA bus and has an assigned I/O base address. It uses a first-in-first-out (FIFO) buffer 24 for storing CAN messages, and it communicates with modules executing in the CPU of the computer by polling or by interrupts. For example, for the local CAN controller 21, in case of a computer using DOS or a Windows operating system, a so-called ISACAN-PC card, available from Hitex-Systementwicklung GmbH, could be used.

Where the local CAN controller 21 interfaces the bridge 10a to the CAN network 11a, the TCP/IP protocol utility 23 interfaces the bridge 10a to the TCP/IP connection over the Internet 16. In the preferred embodiment, the TCP/IP protocol utility 23, executing in the CPU of the computer hosting the bridge, performs Internet communication in the same way as a standard Internet server. Thus, to the Internet, the bridge 10a appears to be an Internet server. On the Internet side of the TCP/IP protocol utility, data being communicated is in the form of packets, according to TCP/IP. On the interfacing application 22 side, data being communicated is in the form of files according to the operating system used by the bridge 10a. The operating system is, in the preferred embodiment, LINEX.

The interfacing application 22 is what provides the conversion between TCP/IP and CAN message protocol. It executes in the CPU of the computer hosting the bridge 10a, along with the TCP/IP protocol utility 23. The interfacing application 22 has tasks to perform whenever the bridge receives a CAN message either over the Internet or from its directly attached CAN network 11a.

Figure 6:
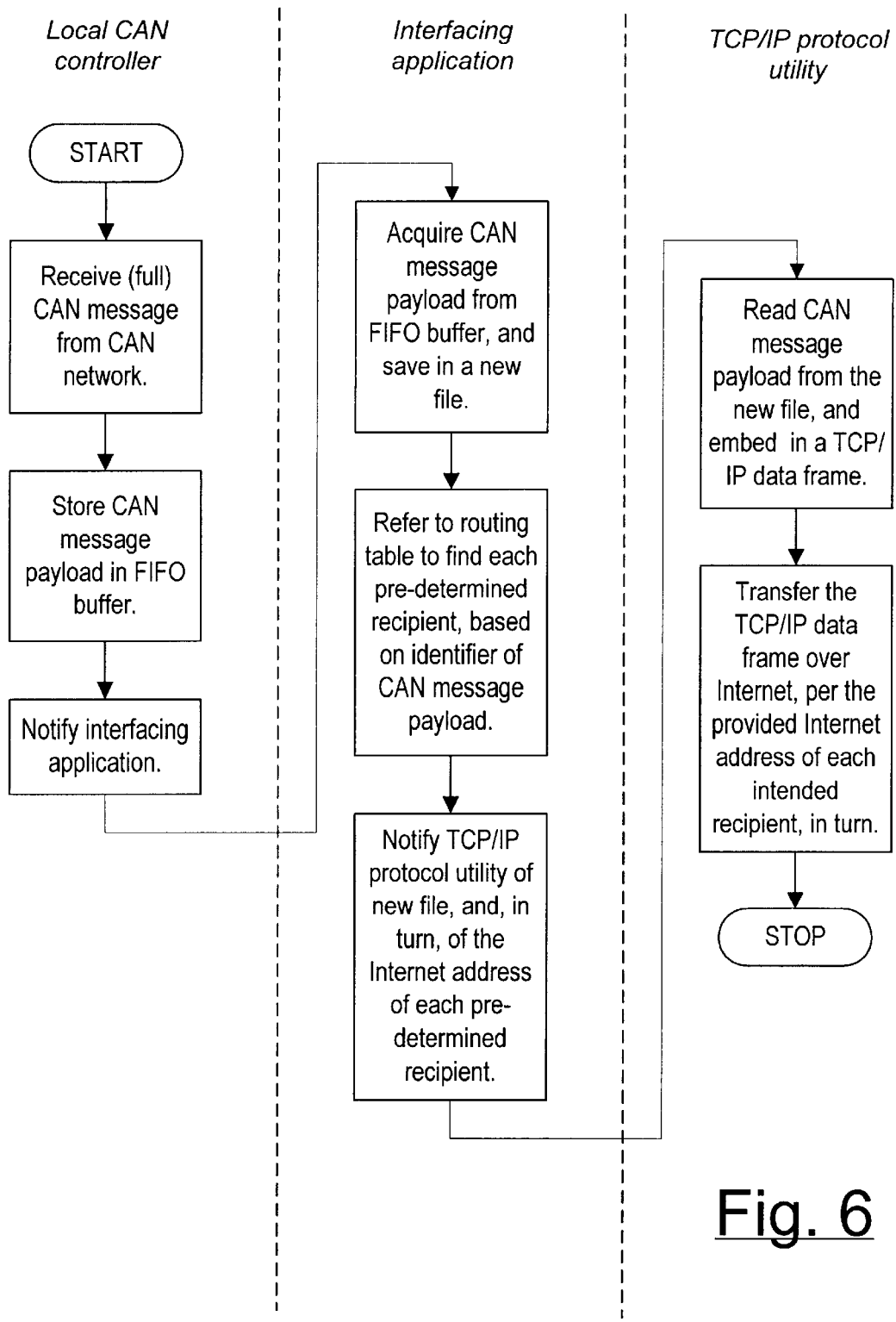
FIG. 6 is a flow chart/task allocation diagram, according to the present invention, for transmitting a CAN message over a TCP/IP network.

Referring now to both FIG. 1 and FIG. 6, when a CAN message is to be transmitted from the first CAN network 11a over the Internet via the bridge 10a, the CAN message is received by the local CAN controller 21 of the bridge 10a, because the CAN message is on an acceptance list of the local CAN controller, as described above, and placed in the FIFO buffer 24, preferably only the payload, i.e. the parts of the CAN message that are to be embedded in a TCP/IP data frame, namely the arbitration field, the control field, and the data field, if any (none for a CAN remote frame). Then the local CAN controller 21 notifies the interfacing application 22 of the CAN message by setting an interrupt, in the preferred embodiment, or when polled by the interfacing application 22. The interfacing application then acquires the CAN message from the FIFO buffer 24 of the local CAN controller 21.

Next, the interfacing application 22 must determine how to address the CAN message for Internet communication. For this, it uses a routing form indicating where to send each CAN message it acquires from the local CAN controller 21, based on the identifier of the CAN message. The routing form indicates each other CAN network, interconnected with the first by the Internet, to which a CAN message is to be sent, based on the identifier of the CAN message used in the first, local CAN network.

TABLE 1

Routing form used by interfacing application when sending a CAN message over a TCP/IP network.

| Identifier (in origin CAN network) | Internet address of recipient |
|---|---|
| id-CAN-A-x1 | 111.111.111.111 |
|  | 222.222.222.222 |
|  | 333.333.333.333 |
|  | 444.444.444.444 |
| id-CAN-A-x2 | 111.111.111.111 |
| id-CAN-A-x3 | 444.444.444.444 |
| id-CAN-A-x4 | 111.111.111.111 |

Table 1 illustrates the routing form used by the interfacing application 22 for the bridge 12a in sending a CAN message from the first CAN network 11a over the Internet to either another CAN network 11b or to a browser 18. The identifiers in the table (not the actual mapping) are symbolic. Thus, id-CAN-A-x1 represents the identifier of a message x1 in CAN network A, (the designator x1 indicating, symbolically, the message content, so that e.g. id-CAN-A-x1 and id-CAN-B-x1 are two different identifiers for the same message content). The actual identifier of course is different. The table indicates that the routing used by the interfacing application will send to four Internet addresses the message from CAN network A with identifier id-CAN-A-x1, the first Internet address being 111.111.111.111 (or an equivalent domain name), and so on.

With a list of recipients prepared, the interfacing application 22 creates a new file containing the CAN message payload, and notifies the TCP/IP protocol utility 23 of the new file and of each recipient address (on the TCP/IP network) in turn. For each recipient provided, the TCP/IP protocol utility 23 then places the content of the new file in a TCP/IP data frame and transmits it over the Internet, per each address provided by the interfacing application 22.

In the preferred embodiment, as mentioned above, the bridge 10a may place more than one CAN message payload in a TCP/IP data frame. For this, the interfacing application 22 will wait a predetermined time before saving the new file with the first CAN message payload, in case other CAN messages are provided by the local CAN controller 21 for any of the same destinations as for the first CAN message.

Figure 7:
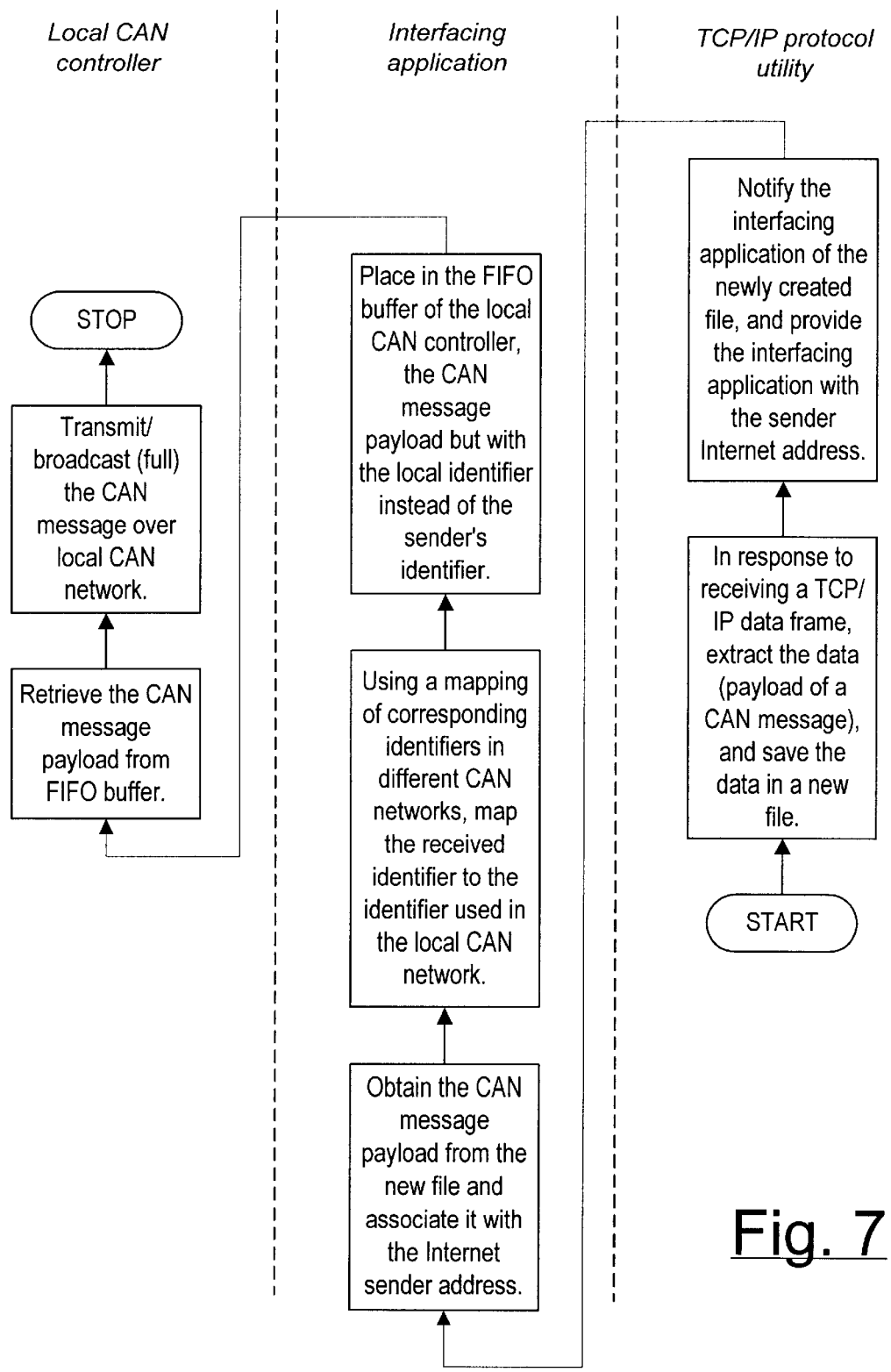
FIG. 7 is a flow chart/task allocation diagram, according to the present invention, for receiving a CAN message over a TCP/IP network.

Referring now to FIG. 7, a bridge according to the present invention is shown acting as a receiving node, receiving a CAN message over the Internet, the CAN message having been provided by a bridge according to the present invention acting as a sending node. When a bridge 10a receives a CAN message payload embedded in a TCP/IP data frame from a remote CAN network 11b, it extracts the CAN message payload, saving it in a new file. Then the TCP/IP protocol utility 23 notifies the interfacing application 22 of the newly created file, identifying the file by name and location on the host computer, and provides the interfacing application 22 with the Internet address of the sender (the sender being a bridge connecting a remote CAN network to the Internet).

Upon receiving the notification from the TCP/IP protocol utility 23, the interfacing application 22 extracts the CAN message payload, with an arbitration field including an identifier appropriate to the sending, remote CAN network, and associates the CAN message with the Internet address of the sending, remote CAN network, as provided by the TCP/IP protocol utility 23. The interfacing application 22 then uses a mapping (as for example in table 2) to determine which identifier in the local CAN network corresponds to the identifier in the new file (i.e. to the identifier used by the remote, sending CAN network), given the Internet address of the sender. Using an interrupt or a polling process to gain access to the FIFO buffer 24 of the local CAN controller 21, the interfacing application 22 then places in the FIFO buffer 24 the CAN message payload, with the sender's identifier replaced by the corresponding identifier for the local CAN network 10a.

TABLE 2

Mapping used by interfacing application when receiving a CAN message over a TCP/IP network.

| Identifier used by sender | Internet address of sender | Identifier to be used by recipient |
|---|---|---|
| id-CAN-B-x1 | 111.111.111.111 | id-CAN-A-x1 |
| id-CAN-C-x1 | 222.222.222.222 | |
| id-CAN-D-x1 | 333.333.333.333 | |
| id-CAN-B-x2 | 111.111.111.111 | id-CAN-A-x2 |
| id-CAN-C-x2 | 222.222.222.222 | |
| id-CAN-D-x2 | 333.333.333.333 | |
| id-CAN-E-x3 | 555.555.555.555 | id-CAN-A-x3 |
| id-CAN-B-x4 | 111.111.111.111 | id-CAN-A-x4 |

In response to the interrupt set by the interfacing application-22, the local CAN controller 21 waits a pre-determined time sufficient for the interfacing application 22 to place the CAN message payload in the FIFO buffer 24, and then retrieves the CAN message payload, provides the additional CAN message fields, including the CRC and ACK fields, required to build a complete CAN message (CAN data frame or CAN remote frame), and transmits (broadcasts) the complete CAN message over the local CAN network 11a.

As mentioned above, the present invention is intended to comprehend having a node hosting only a browser (not a bridge according to the present invention) receive a CAN message provided by a bridge acting as a sending node, in which case the browser, acting as the receiving node, in some embodiments, simply extracts the CAN message payload from the TCP/IP frame and presents the CAN message payload for examination by the user of the browser. In the preferred embodiment, however, the browser-hosting receiving node also uses a mapping to alter the identifier in the received CAN message so as to conform to identifier-content usage at the receiving node, the altering based on the Internet address of the sending node.

It is to be understood that the above-described arrangements are only illustrative of the application of the principles of the present invention. In particular, as explained above, the present invention is not limited to use in sending CAN messages over the Internet; it comprehends sending CAN messages over any network in which communication is according to TCP/IP, such as any Ethernet. In addition, numerous modifications and alternative arrangements may be devised by those skilled in the art without departing from the spirit and scope of the present invention, and the appended claims are intended to cover such modifications and arrangements.

What is claimed is:

1. A method of communicating a controller area network (CAN) message between a sending node, attached to a sending CAN network, and a receiving node, the sending and receiving nodes interconnected by a network communicating according to transmission control protocol/Internet protocol (TCP/IP), the CAN message including:

a start of frame bit, a CAN message payload, a cyclic redundancy check field, an acknowledgment field, and an end of frame field;

the CAN message payload including:

an identifier field, intended to identify the content of the CAN message, based on. a pre-determined identifier-content correspondence that is node-dependent, a remote transmission request bit, a control field, and an optional data field;

the communicating according to TCP/IP performed by transmitting TCP/IP frames, including a header, a footer, and a TCP/IP data field; the method comprising the steps of:

a) having the sending node extract the CAN message payload from the CAN message;

b) having the sending node embed the CAN message payload in the TCP/IP frame as the TCP/IP data field of the TCP/IP frame;

c) having the sending node refer to a routing form to determine the address on the TCP/IP network of the receiving node; and d) having the sending node,transmit the TCP/IP frame over the TCP/IP network using the address for the receiving node from the routing form;

wherein the routing form indicates, for each of a plurality of different possible CAN message identifier field values, an address on the TCP/IP network for other CAN networks interconnected with the sending CAN network via the TCP/IP network.

2. The method of claim 1, wherein the receiving node is attached to a receiving CAN network, and the method further comprises the steps of:

a) having the receiving node extract the CAN message payload from the TCP/IP frame;

b) having the receiving node alter the identifier of the CAN message payload, as needed, so as to correspond to the CAN message content in the receiving CAN network, the altering performed by reference to a mapping relating identifiers in different CAN networks, the different CAN networks being distinguished by their network addresses; and c) having the receiving node broadcast the CAN message on the receiving CAN network.

3. The method of claim 1, wherein the receiving node hosts a browser, and the method further comprises the steps of:

a) having the receiving node extract the CAN message payload from the TCP/IP frame;

b) having the receiving node alter the identifier of the CAN message payload, as needed, so as to correspond to the CAN message content at the receiving node, the altering performed by reference to a mapping relating identifiers based on the network address of the sending node.

4. An apparatus for sending a controller area network (CAN) message from a sending node, attached to a sending CAN network, to a receiving node, the sending and receiving nodes interconnected by a network communicating according to transmission control protocol/Internet protocol (TCP/IP), the CAN message including:

a start of frame bit, a CAN message payload, a cyclic redundancy check field, an acknowledgment field, and an end of frame field;

the CAN message payload including:

an identifier field, intended to identify the content of the CAN message, based on a pre-determined identifier-content correspondence that is node-dependent, a remote transmission request bit, a control field, and a data field of variable length;

the communicating according to TCP/IP performed by transmitting TCP/IP frames, including a header, a footer, and a TCP/IP data field; the apparatus comprising:

a) a local CAN controller, responsive to the CAN message as broadcast over the sending CAN network, for extracting the CAN message payload from the CAN message and for saving the CAN message payload in a buffer;

b) an interfacing application, responsive to the CAN message payload in the buffer, for embedding the CAN message payload in the TCP/IP frame as the TCP/IP data field of the TCP/IP frame, and for providing the address on the TCP/IP network of the receiving node by referring to a routing form; and d) a TCP/IP protocol utility, responsive to the address of the receiving node and further responsive to the TCP/IP frame in which the CAN message payload is embedded, for transmitting the TCP/IP frame over the TCP/IP network using the address for the receiving node determined from the routing form;

wherein the routing form indicates, for each of a plurality of different possible CAN message identifier field values, an address on the TCP/IP network for other CAN networks interconnected with the sending CAN network via the TCP/IP network.

5. An apparatus for receiving at a receiving node a controller area network (CAN) message sent from a sending node, the sending node attached to a sending CAN network, the receiving node attached to a receiving CAN network, the sending and receiving nodes interconnected by a network communicating according to transmission control protocol/Internet protocol (TCP/IP), the CAN message including:

a start of frame bit, a CAN message payload, a cyclic redundancy check field, an acknowledgment field, and an end of frame field;

the CAN message payload including:

an identifier field, intended to identify the content of the CAN message, based on a pre-determined identifier-content correspondence for the CAN network in which the CAN message is being communicated, a remote transmission request bit, a control field, and an optional data field;

the communicating according to TCP/IP performed by transmitting TCP/IP frames, including a header, a footer, and a TCP/IP data field; the apparatus comprising:

a) a TCP/IP protocol utility, responsive to the TCP/IP frame in which the CAN message payload is embedded, for extracting the CAN message payload from the TCP/IP frame, and for providing the network address of the sending node;

b) an interfacing application, responsive to the CAN message payload extracted from the TCP/IP frame and to the network address of the sending node, for altering the identifier of the CAN message payload, as needed, so as to correspond to the CAN message content in the receiving CAN network, the altering performed by reference to a mapping relating identifiers in different CAN networks, the different CAN networks being distinguished by their TCP/IP network addresses, for providing the CAN message payload with the altered as needed identifier in a buffer; and c) a local CAN controller, responsive to the CAN message payload in the buffer, for augmenting the CAN message-payload with additional fields as required to provide a complete CAN message, and for broadcasting the completed CAN message over the receiving CAN network.

* * * * *